Patented Feb. 2, 1943

2,310,104

UNITED STATES PATENT OFFICE 2,310,104

WELDING ALLOY

William C. McLott, Grand Rapids, Mich.

No Drawing. Application August 6, 1941,
Serial No. 405,625

3 Claims. (Cl. 75—126)

This invention relates to a new alloy, the principal ingredients of which are iron, tungsten, molybdenum and chromium with boron. There is also less than 1% of carbon, a trace of silicon, and a small amount of columbium (also called niobium). The carbon combined with the iron provides a steel sheath for the tungsten, molybdenum and boron elements. The alloy produced by the large amount of tungsten combined with the molybdenum in conjunction with the chromium and boron provides a tungsten, molybdenum steel bond far superior to any high test steel known with the extremely hard boron particles in association and combination therewith producing an alloy that is as hard as sapphire and capable of resisting impact and abrasion even though subjected to high heat generated by impact and friction. Boron has a hardness of 95 compared to the diamond at 100.

The alloy when melted and deposited properly on a steel surface is bonded thereto by a bond which has greater strength than the base steel metal upon which the alloy is deposited. There will be a slight inter-penetration and mixing of tungsten and molybdenum with the metal of the base which strengthens such metal at the line of deposit and fusion. Thus the alloy will not separate from the base nor chip off therefrom.

The alloy is hard at a temperature of 1100° F. and remains hard at red heat. Thus it may be used in turning and boring steel tempered to 400 Brinell in connection with certain operations where such hard steel cannot be annealed. The alloy also provides an excellent cutting edge for metal turning, boring and drilling operations. Applied to paper trim knives, veneer knives, chipper knives and the like, it forms an especially resistant cutting edge and one which does not dull under severe usage.

The alloy which I have provided is capable of sustaining severe impacts and is strongly resistant to abrasion of the most severe type and character, for example, as in heavy duty scarifying of rock and stone, such as occurs in rotary oil well fishtail and cutter bit operations; also in seam undercutter tools and in mining and in many other classes of heavy duty work where considerable heat is generated.

The tensile strength is above 250,000 pounds per square inch. Testing machines for hardness do not give the correct readings of hardness because the extremely hard boron constituent will yield or move in the tungsten, molybdenum, chromium bond, therefore hardness readings obtained are of the bond and average 585 to 590 Brinell.

The alloy which I have produced is applied by melting and depositing by either the heat of an electric arc, A. C. or D. C., or by gas melting such as the oxy-acetylene method. When used in electric arc melting the rods are coated with a special coating but for oxy-acetylene melting no coating is used.

I have found that an alloy composed of tungsten approximately 18 to 22%, molybdenum 7 to 8%, chromium 4 to 5% and boron 2 to 2.5% with carbon substantially 0.7 to 0.9%, columbium 0.2 to 0.3% and with scarcely more than a trace of silicon, or 0.01 to 0.02%, the balance being iron, produces a material having the above stated properties, very hard and resistant to abrasion, of great strength, capable of sustaining high temperatures without affecting its hardness, toughness or strength to any appreciable degree and which can readily be deposited either by oxy-acetylene or electric arc melting. The melting point of the alloy is approximately 2600° F. and its hardness is 89 compared to the diamond at 100. The elongation is substantially nil upon increases in temperature. The coefficient of expansion is .0000058" per degree F. so that a rise in temperature of 1,000° F. would cause an expansion of less than .006 of an inch. The range of the ingredients specified is relatively narrow and the best range which I have found is approximately midway between the minimum and maximum amounts stated. For example tungsten at approximately 20% or the mean between 18 and 22%, molybdenum at 7.5%, chromium at approximately 4.5%, carbon at 0.8%, columbium at approximately .025% with the boron ranges so narrow that an approximate 2% which is best, though it can be increased to 2.5% are all substantially at the halfway or median mark between the minimum and maximum limits. Or if to say the same thing in fractional parts of the total alloy, tungsten at 20% is approximately one-fifth of the alloy, molybdenum at 7.5% approximates three-fortieths thereof, chromium between 4 and 5% approximates one-twentieth and boron between 2 and 2.5% is between one-fortieth and one-fiftieth of the total alloy. In the same way chromium at 4 to 5% and boron at 2 to 2.5% means that there is one-half as much boron as chromium. The same fractions in comparison of the amounts of the elements to each other may be followed so that with 20% tungsten and molybdenum 7 to 8% the molybdenum approaches but is less than one-half the amount of the tungsten. Molybdenum at 7 to 8% and chromium at 4 to 5%, the chromium approximates one-half of the molybdenum and with chromium at the percentages named, boron at 2 to 2.5% approximates one-half the amount of the chromium.

The alloy is provided in the forms of rods which are uncoated for oxy-acetylene melting of the rods and their deposition upon a steel base. The temperature of the melting flame will not exceed 3500° F. at which temperature and below 3600° F. there are no carbon and nitrogen metallic troubles.

For electric melting the alloy rods are coated with a novel flux composition. Such flux consists of dry and wet elements mixed together in the proportion of 55% of the dry elements to 45% of the wet. The dry elements are marble 38 to 42%, graphite 35 to 38%, fluorspar 15 to 18%, titanium 6 to 8% with a balance required to make the 100% being supplied by diatomaceous earth. The wet elements are sodium silicate 30% to 70% distilled water. The rods are coated with the flux so that of the total weight of the rod 6% thereof consists of the flux dry elements and 94% the weight of the metal alloy. The marble and fluorspar are well known fluxing and oxygen exclusion elements. The graphite used in the coating maintains the carbon content in the deposited metal while the titanium used insures against nitrogen combining with the chromium or iron which if it occurred would cause detrimental results. Such nitrogen affecting of the deposit will occur when the melting and deposition takes place in the air at temperatures exceeding 3600° F., which temperatures are reached and exceeded in the electric arc. Nitrogen, as is well known, forms a major constituent of the atmosphere and without titanium nitrogen chromium and nitrogen iron compounds would be formed in the deposit.

I have described the preferred composition of my new alloy and in the percentages which are the best so far as I have been able to determine. It is to be understood however that the invention is not necessarily limited to the exact specific percentages given but may be practiced in the scope of the following claims which define the invention.

I claim:

1. A temperature resisting, hard and tough alloy of iron alloyed with tungsten approximating between 18 to 22%, molybdenum 7 to 8%, chromium 4 to 5%, and boron 2 to 2½%, carbon being substantially 0.7 to 0.9% and columbium 0.2 to 0.3%.

2. A hard, tough alloy of iron, the iron being alloyed with tungsten at approximately 20%, molybdenum at approximately 7.5%, chromium at approximately 4½%, boron at approximately 2% with carbon substantially at 0.8% and columbium approximating 0.25%.

3. An alloy which is hard and tough and resistant to abrasion and remains hard at red heat in which the main ingredient is iron alloyed with 20% tungsten, molybdenum approaching one-half the tungsten, chromium one-half the amount of molybdenum, boron approximating one-half the amount of chromium, columbium approximating 0.2 to 0.3% and with less than 1% of carbon.

WILLIAM C. McLOTT.